Inventor:
Theodore A. Rich,
by Harry E. Dunham
His Attorney.

Patented Aug. 22, 1944

2,356,617

UNITED STATES PATENT OFFICE 2,356,617

QUICK RESPONSE DIRECT-CURRENT INSTRUMENT

Theodore A. Rich, Schenectady, N. Y., assignor to General Electric Company, a corporation of New York Application January 25, 1943, Serial No. 473,436

4 Claims. (Cl. 171—95)

High sensitivity direct current measuring instruments are sluggish in their operation. That is, when subjected to a change in voltage or current, it takes some little time for the pointer to move to the new measurement position, and it is the object of my invention to overcome such sluggishness without interfering with the measurement accuracy. In carrying my invention into effect I include in the measuring circuit, energy storage means for momentarily boosting or amplifying the change in current to which the measuring instrument is subjected when the current to be measured changes, such boosting being proportional to the change, of the desired amount and in the desired direction (plus or minus) to obtain quick and accurate response without damage to the measuring instrument.

Figure 1:
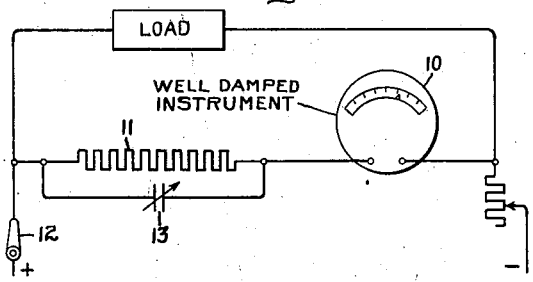
Figure 2:
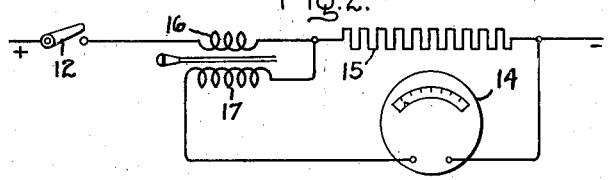
Figure 3:
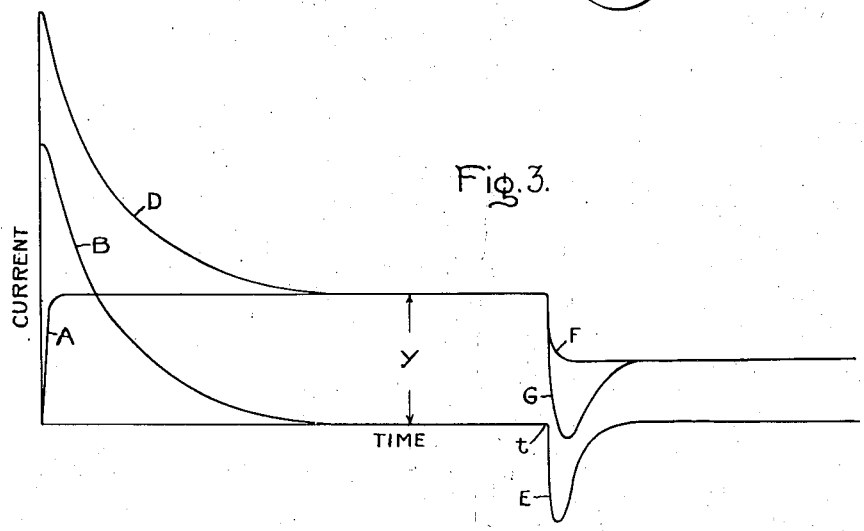
Figure 4:
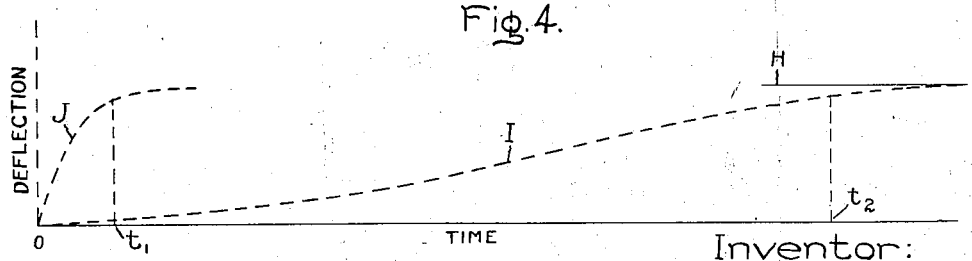

The features of my invention which are believed to be novel and patentable will be pointed out in the claims appended hereto. For a better understanding of my invention, reference is made in the following description to the accompanying drawing in which Fig. 1 illustrates a voltmeter employing a condenser as the energy storing means associated therewith, and Fig. 2 represents an ammeter with which there is associated a transformer energy storage means. Fig. 3 shows current-time curves explanatory of my invention, and Fig. 4 comparative instrument deflection-time curves with and without my invention.

In Fig. 1, 10 represents a microammeter which is connected in series with a high resistance 11 for measuring the voltage across a load, as indicated, and which is supplied from the direct current source marked ± and —. To give a practicable example but not with the intention of limiting the invention, let it be assumed that the instrument 10 is a 1600-ohm microammeter, the resistance 11 is two megohms, and that the voltage across the load is of the order of 30 or 40 volts, and 40 volts across the load correspond to full scale deflection of instrument 10.

Assume the instrument is well damped as it should be for practicable purposes and that the condenser shown at 13 is not present. When the instrument is energized by closing switch 12, it will require an appreciable interval for the pointer of the instrument to move up to the proper measurement point on the scale, and the pointer will be slow or sluggish in following changes in voltage variation. To overcome this sluggishness, I connect the condenser 13 in parallel with the resistance 11, as shown. Now when the switch 12 is closed, there is a sudden rush of current through the instrument 10 which goes to charge the condenser. Such current rush is considerably in excess of the normal current taken by the instrument but quickly drops to the normal value as the condenser becomes charged and thereafter is the same under steady state conditions as it would be without the condenser. Such momentary rush of current gives the instrument a boost which moves the pointer to the proper measurement position very quickly but does not impair or otherwise affect its measurement accuracy.

To obtain best results it is of course necessary that the condenser be of the desired value in relation to the other constants of the circuit. Otherwise the boosting will be insufficient or too much. For example, a condenser which is too small will decrease but not completely overcome sluggishness, and a condenser which is too large will move the pointer beyond the correct measurement value, and sluggishness will result in the pointer returning to correct position. For the circuit constants as previously mentioned and a well damped instrument, a condenser of about .12 microfarad capacity will be found to be satisfactory. The capacity should be decreased when used with an instrument with less damping, and vice versa. If the instrument has no damping, the condenser will not be helpful but will only increase the undesirable fluctuations of the pointer which occur with an undamped instrument with changes in energizing current. The resistance across which the condenser is connected should in general be a major part of the resistance of the instrument circuit. The desired capacity of the condenser will depend upon the relative value of the resistance across which it is connected and the total resistance of instrument circuit. For instance, if the resistance 11 is considerably smaller than heretofore represented, the condenser 13 should have more capacity because its final charging voltage will become a lesser part of the voltage across the instrument circuit. For some applications it may be desirable to have some resistance in series with the capacitor to limit the inrush current.

With each change in line voltage there will be a corresponding change in voltage across the condenser, and the condenser will charge or be discharged with increases and decreases in line voltage and in proportion to such changes. Hence the presence of the condenser is beneficial in obtaining a quick response of the instrument when the voltage drops as well as when it increases. Upon a sudden decrease in voltage the condenser will discharge largely through the load circuit and momentarily may even reverse the direction of current flow through the instrument. The result is that the current through the instrument is momentarily decreased below the measurement value and the pointer is quickly moved downscale by the return spring until the condenser has discharged to the new value of voltage corresponding to the lower value of measurement current.

The manner in which the currents vary in instrument 10, resistance 11, and condenser 13 may be represented as in Fig. 3 where the ordinates represent current and the abscissae time. In the case where we have no condenser, the current in the resistance 11 and instrument 10 would rise as represented by curve A, Fig. 3, to a value $y$ corresponding to the measurement voltage when switch 12 is closed. Because of the energy necessary to move the pointer upscale against damping and the return spring, it requires a considerable time for the pointer to reach measurement position. However, when the condenser 13 is connected as shown, the condenser charging current may be represented by curve B, the current through resistance 11 approximately by curve A, and the current through instrument 10 by the sum of currents B and A or D. When the condenser becomes charged, the current in the resistance and instrument is the same value $y$ as before. However, the boosting energy which passed through the instrument due to the charging current of the condenser is sufficient to move the pointer to measurement position in a much shorter time than when the condenser is omitted. Now assume that at time $t$ the load voltage drops to one half the previously assumed value. The condenser discharges and such discharge current may be represented by curve E. This discharge current flows mostly through instrument 10 to the load, and the direction of current in the instrument may drop to a zero value, or even reverse as represented by curve G. The current which flows through the resistance 11 may be represented by curve F. As soon as the condenser has discharged to the new voltage condition, the current through the instrument 10 and resistance 11 becomes the same and of the correct measurement value. The fact that the instrument current dropped considerably below the true measurement value momentarily, as represented by curve G, allowed the pointer to move downscale quickly to the correct measurement position, and much more quickly than it would without the condenser.

Instrument damping may be accomplished by any of the well-known methods and if not incorporated in the instrument construction itself, it may be done by connecting a suitable non-inductive resistance across the instrument.

Instead of employing a condenser in series relation to the instrument as the energy storage means, I may use an inductance in shunt relation or I may use a transformer as represented in Fig. 2. In Fig. 2 an ammeter 14 is connected across a shunt resistance 15 in the current circuit shown, the terminals of which are designated + and −. Included in the current circuit is the primary 16 of a transformer, the secondary 17 of which is connected in series with the ammeter 14. Now it will be evident that when the switch 12 is closed or there is an increase in current through the circuit for any reason, the transformer if properly connected will produce a momentary boosting current through the well damped ammeter 14 but as soon as the current reaches a steady state value, the transformer will have no effect. Likewise, for a sudden decrease in current the transformer will momentarily give the ammeter current a negative boost below normal measurement value. The energy which is momentarily given out or absorbed by the transformer is made of the correct value in relation to the ballistic characteristics of the instrument and resistance shunt arrangement to quickly move the pointer to the correct measurement position but does not influence the accuracy of the measurement under steady state conditions. As in Fig. 1, the energy which is thus controlled by the energy storage means is inherently automatically proportional to the measurement changes and to the boosting or bucking desired.

If desired, the energy storage device used may be adjustable to obtain the best results under different circuit or load conditions, and in Fig. 1 the condenser is shown as adjustable, and in Fig. 2 the core part of the transformer is represented as having a handle by means of which it may be moved endwise relative to the coils to vary the transformer coupling. It is apparent that such adjustments have no effect upon the steady state current conditions, and hence, such adjustments may be made without changing the instrument calibration.

In Fig. 4 the time $0-t_2$ may represent the time for the instrument pointer of Fig. 1 to reach 90 per cent of correct measuring deflection after the instrument is energized when no condenser or other boosting means is present. Correct measurement deflection is represented by the horizontal line H and the deflection-time curve by I. With the condenser the deflection-time curve may be represented by J, indicating that the pointer reaches 90 per cent true deflection in the very much shorter time $0-t_1$. It is seen that the first portion of pointer travel is highly accelerated by means of my invention. The approach to final reading is not so greatly improved although it is still faster than without the invention. Rapidly changing voltages which would not be apparent without the invention become evident when the invention is used. Adjusting a circuit for a given voltage or current condition becomes easier and faster where the instrument used to indicate the result of the adjustment is provided with my invention. It will of course be apparent that the circuit parts used, such as the resistance 11 and condenser 13 of Fig. 1, may be incorporated in the instrument case.

I have herein shown and particularly described certain embodiments of my invention and certain methods of operation embraced therein for the purpose of explaining its practice and showing its application, but it will be obvious to those skilled in the art that many modifications and variations are possible, and I aim therefore to cover all such modifications and variations as fall within the scope of my invention which are defined in the appended claims.

What I claim as new and desire to secure by Letters Patent of the United States is:

1. A well damped direct current measuring instrument of the deflection type adapted to be connected in a direct current measuring circuit to produce a measurement deflection proportional to the current flowing through said instrument, and means for causing said instrument to respond quickly to increasing and decreasing current measurement changes of different magnitudes comprising unitary electrical energy storage means, associated with the measuring circuit of the instrument, to momentarily amplify current changes through said instrument in proportion to and in the direction of the changes to be measured, said energy storage means responding only to such changes and being nonresponsive to steady-state measurement conditions of the instrument.

2. A well damped direct current measuring instrument of the deflection type adapted to be connected in a direct current measuring circuit to produce a measurement deflection proportional to the current therethrough, and means for causing said instrument to respond quickly to increasing and decreasing current measurement changes of different magnitudes comprising unitary electrical energy storage means associated with the instrument energizing circuit and subject to the instrument current measurement changes such that the energy stored or released by said means in response to such changes causes proportional current surges through an energizing circuit of said instrument which is in addition to the normal measurement energizing current and in the direction of the current change, said energy storage means having no influence on the steady-state energizing current of said instrument.

3. A direct current measuring instrument of the well damped deflection type, a resistance in series therewith greater than the resistance of the instrument itself and a condenser in shunt to said resistance, said condenser serving to store and release energy when the current through the instrument measuring circuit rises and falls to cause corresponding momentary current surges through the instrument in a direction and of a magnitude to overcome sluggishness in the deflection response of said instrument to measurement current changes.

4. A direct current measuring instrument of the well damped deflection type having a measuring circuit including a resistance with which the instrument is connected in parallel, a transformer having a primary coil connected in series with the parallel connected resistance and instrument and a secondary coil connected in series with the instrument in a direction to amplify current changes through the instrument for the purpose of overcoming sluggishness in the deflection response of said instrument to measurement current changes.

THEODORE A. RICH.